United States Patent
Wang et al.

(10) Patent No.: US 11,064,028 B2
(45) Date of Patent: Jul. 13, 2021

(54) METHOD AND APPARATUS FOR DEDUPLICATION OF SENSOR DATA

(71) Applicant: INTERNATIONAL BUSINESS MACHINES CORPORATION, Armonk, NY (US)

(72) Inventors: Zhennan Wang, Austin, TX (US); John Sanchez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/381,399

(22) Filed: Apr. 11, 2019

(65) Prior Publication Data

US 2020/0329102 A1    Oct. 15, 2020

(51) Int. Cl.
| H04L 12/28 | (2006.01) |
| H04L 29/08 | (2006.01) |
| H04L 12/26 | (2006.01) |
| H04L 12/66 | (2006.01) |

(52) U.S. Cl.
CPC .............. *H04L 67/12* (2013.01); *H04L 12/66* (2013.01); *H04L 43/106* (2013.01); *H04L 43/16* (2013.01)

(58) Field of Classification Search
CPC ......... H04L 67/12; H04L 12/66; H04L 43/16; H04L 43/106; H04L 43/028; H04L 43/022
USPC ........................................................ 370/401
See application file for complete search history.

(56) References Cited

U.S. PATENT DOCUMENTS

| 9,473,514 | B1 | 10/2016 | Chou et al. | |
| 2003/0224729 | A1 | 12/2003 | Arnold | |
| 2009/0225676 | A1* | 9/2009 | Kisela | H04L 1/24 370/252 |
| 2011/0206055 | A1* | 8/2011 | Leong | H04L 49/00 370/401 |
| 2012/0197582 | A1 | 8/2012 | Richardson | |
| 2018/0330315 | A1 | 11/2018 | Gurumohan et al. | |

OTHER PUBLICATIONS

Jeon et al., "Redundant Data Removal Technique for Efficient Big Data Search Processing." International Journal of Software Engineering and Its Applications vol. 7, No. 4, Jul. 2013.
Schiffman "SPAN Packet Duplication: Problem and Solution" Cisco, Oct. 4, 2012.

* cited by examiner

*Primary Examiner* — Mang Hang Yeung
(74) *Attorney, Agent, or Firm* — Stephen R. Yoder

(57) ABSTRACT

A method and apparatus for deduplication of sensor data is described. In one embodiment, a method includes receiving a plurality of sensor packets P at a network gateway apparatus. Each packet Pi has a corresponding timestamp Ti. The method includes storing a subset of the plurality of received packets P' for a first period of time T1. The method also includes comparing each of the stored packets P'i to other stored packets P'j to determine an equivalence. In response to determining the equivalence of the stored packet P'i with P'j, the method includes forwarding only one of packet P'i or P'j to a destination.

17 Claims, 10 Drawing Sheets

METHOD AND APPARATUS FOR DEDUPLICATION OF SENSOR DATA

BACKGROUND

The present invention relates to sensor data, and more specifically, to a method and apparatus for deduplication of sensor data in a wireless network.

The Internet of Things (also known as "IoT") refers to the internetworking of physical devices, vehicles, buildings and other items that include embedded electronics, software, sensors, actuators, and network connectivity that enable these IoT devices to collect and exchange data. An IoT application usually has four layers—Sensor Layer, Gateway Layer, Management Service Layer, and Application Layer. The Sensor Layer is made up all kinds of sensors which collect real-time data. The sensor data is aggregated on gateways and transferred to the Management Service Layer (e.g., an IoT cloud). Connections between a sensor and a gateway can be wired or wireless. For a wired connection, only the gateway connected to the sensor can receive the sensor's data. This arrangement guarantees that a sensor's packets will be received and sent out to the IoT cloud one time. Because the sensor and the receiver are physically wired together, however, it is not convenient to use this kind of connection for mobile sensors, for example, a sensor worn by a person or disposed in a device without a fixed location.

Wireless sensors are usually cheaper to install and easy to maintain. They are widely used in people and/or device tracking related IoT projects because of their flexibility and mobility. For example, a Bluetooth sensor can be attached to a person's body to track his or her heartbeat rate or other data. The sensor broadcasts its data to gateways that are deployed around this person's activity places. The sensor data can be always received by a gateway or gateways if enough gateways are deployed so that there is no signal dead zone left, no matter where the person goes.

A Bluetooth sensor, which is a type of wireless sensor, can communicate with a gateway in two modes: connection mode and broadcast mode. With the connection mode, a sensor and a gateway need to set up a connection before they can communicate with each other. Because only one gateway can connect with a sensor at a certain moment, and the sensor data can be only received by the gateway that connected to it, there is no duplication issue from the physical packet perspective. With the broadcast mode, a Bluetooth sensor can broadcast its data in its advertising packet. In this broadcast mode, there is no need to set up a connection between a sensor and a gateway to read the sensor's data. Any gateway is able to receive the sensor data as long as the gateway is within a sensor's signal range. If there are more than two gateways in that sensor's signal range, each gateway might receive the sensor's broadcasted packet. If all these gateways transmit their received packets to the IoT cloud, there might be a duplication issue with respect to the broadcasted packet.

A packet transmission between a sensor and a gateway may be subject to interference from other devices such as radios and cell phones. Additionally, because Bluetooth is based on packet transmission and frequency hopping (FH) technologies, packet collisions can also cause further packet loss. To increases data availability and lower the data loss probability, sometimes multiple gateways are deployed at certain locations so that a sensor can be "seen" by multiple gateways. However, if multiple gateways received the same packet broadcasted from a sensor, the number of duplicate packets received at the IoT cloud can increase.

SUMMARY

According to an embodiment, a method is provided for deduplication of sensor data. The method includes receiving a plurality of sensor packets P (P1, P2, . . . , Pn) at a network gateway apparatus, wherein each packet Pi has a corresponding timestamp Ti. The method also includes storing a subset of the plurality of received packets P' (P'1, P'2, . . . , P'j) for a first period of time T1. The method includes comparing each of the stored packets P'i to other stored packets P'j to determine an equivalence. In response to determining the equivalence of the stored packet P'i with P'j, the method includes forwarding only one of packet P'i or P'j to a destination.

In another form, a computer program product for deduplication of sensor data is provided.

In another form, an apparatus for implementing the method for deduplication of sensor data is provided.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
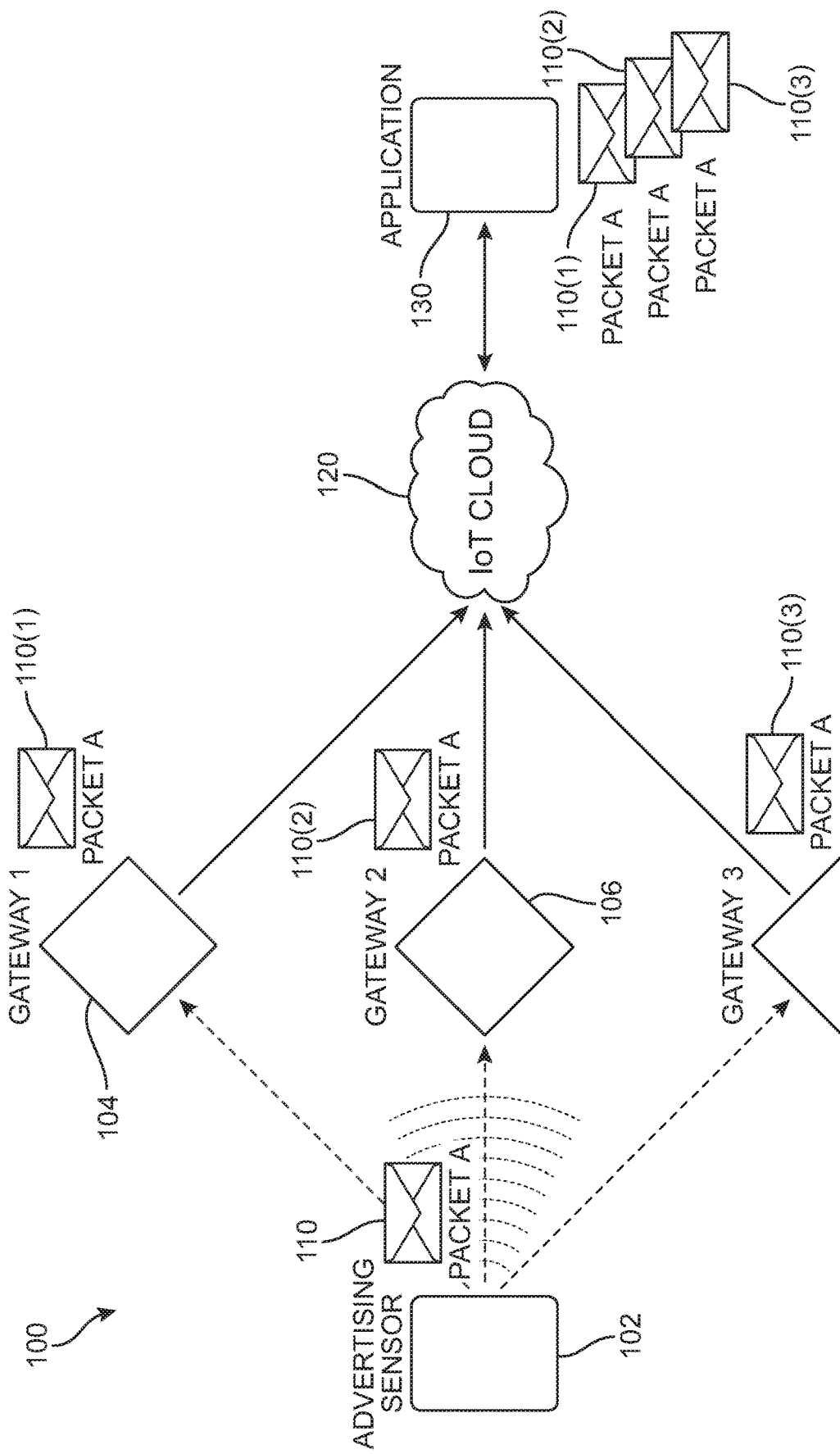
FIG. 1 is a diagram of an example embodiment of duplicate sensor packets reaching a destination.

Aspects of the example embodiments described herein provide a method and apparatus for deduplication of sensor data. With reference now to FIG. 1, an illustration of a wireless network 100 in which duplicate sensor packets are generated is shown. In some embodiments, wireless network 100 may include multiple gateways or wireless access devices that are in communication with at least one wireless sensor 102. As shown in FIG. 1, wireless network 100 includes a first gateway 104, a second gateway 106, and a third gateway 108.

In this embodiment, wireless sensor 102 is a Bluetooth sensor and the three gateways (e.g., first gateway 104, second gateway 106, and third gateway 108) are within the signal range of wireless sensor 102. As a result, when wireless sensor 102 broadcasts or advertises a packet A 110, all three gateways 104, 106, 108 receive a digital copy of packet A 110. For example, as shown in FIG. 1, first gateway 104 receives a first copy of packet A 110(1), second gateway 106 receives a second copy of packet A 110(2), and third gateway 108 receives a third copy of packet A 110(3).

In this embodiment, all three gateways 104, 106, 108 forward their received copies of packet A 110 (e.g., digital copies 110(1), 110(2), and 110(3)) to an IoT cloud 120, where an IoT application 130 associated with IoT cloud 120 receives three identical copies of packet A 110 (i.e., first copy 110(1), second copy 110(2), and third copy 110(3)). Thus, in this embodiment, duplicate packets are received because each of the gateways (e.g., gateways 104, 106, 108) send an identical copy of packet A 110.

Duplicate data increases an application's cloud data usage cost and storage utility costs. Additionally, transferring duplicate sensor data packets to an IoT cloud may cause other issues. Under some circumstances, for example, if a data analysis program relies on the number of data packets it receives to generate an analysis result, duplicate packets can affect data analysis accuracy and can lead to incorrect results.

Bluetooth sensors usually do not have an identifier or a serial number in their advertising packets that can be used to identify if a packet is a duplicate of another packet. As shown in FIG. 1, duplicate sensor data packets can originate from a broadcasted packet from one sensor that is received by multiple gateways. Additionally, from an application point of view, some packets received at gateways do not physically originate from a single sensor packet, but logically some applications may still treat these packets as duplicates if the packets contain the same sensor data. In both these situations, the packets are identical and should be deduplicated before they are sent to out from the wireless network (e.g., wireless network 100) to the IoT cloud (e.g., IoT cloud 120).

According to the techniques of the example embodiments described herein, a solution is provided that uses a master gateway to centralize data processing, transmit data to the IoT cloud, and check sensor data and timestamps added at receiving gateways to eliminate duplicate packets (i.e., deduplication). As used herein and in the claims, a packet is considered a duplicate of another packet if both packets are from the same sensor, the sensor data in the packets is the same, and the times packets were received at gateways fall within the same user-defined time period or window. Accordingly, there are two different types of duplicate packets defined: (1) packets that originate from a single sensor packet that are received by multiple gateways (i.e., each packet received at a gateway is a digital copy of the original packet), and (2) packets that a sensor advertises during a defined period of time that include the same sensor data.

Figure 2:
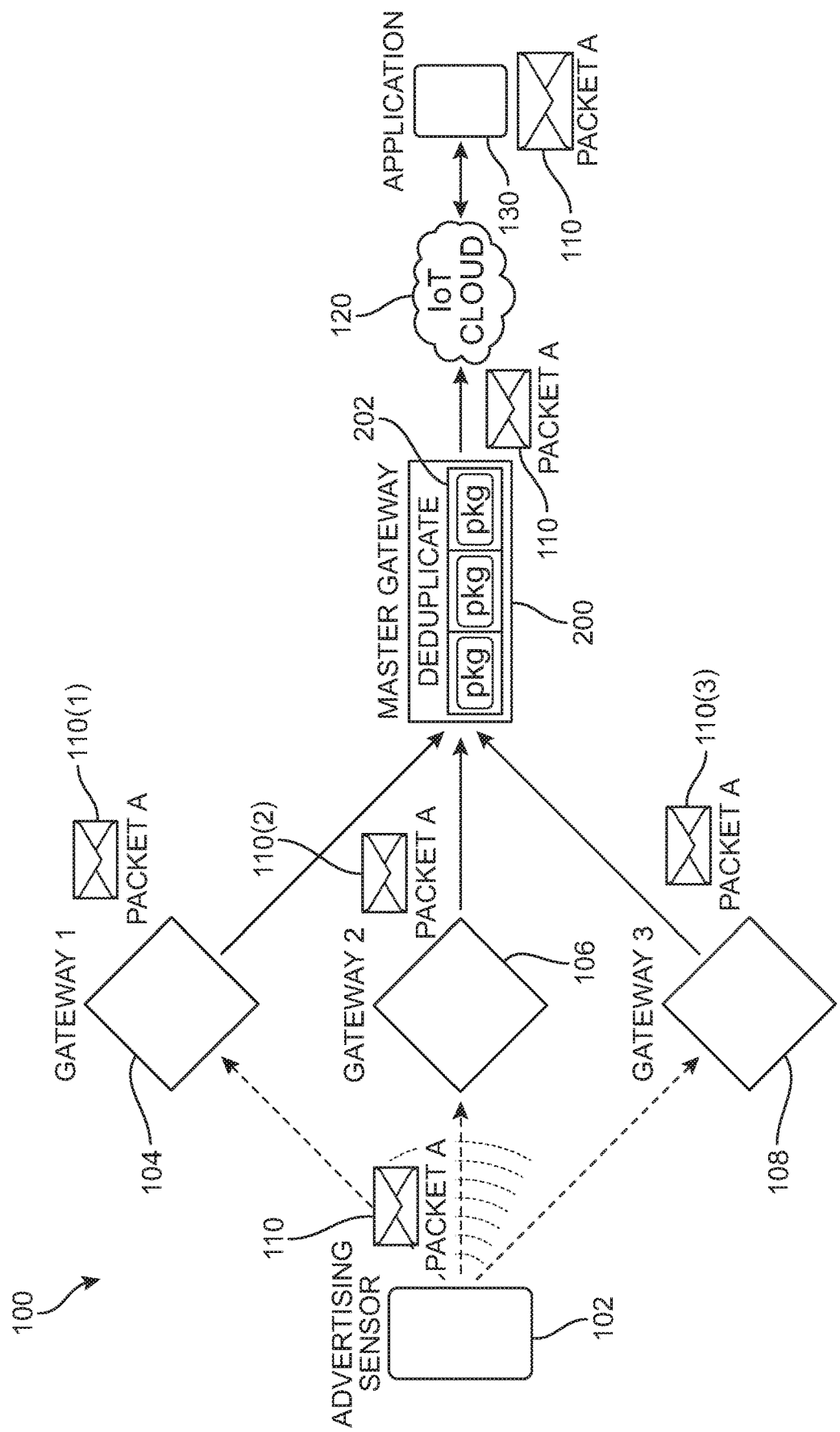
FIG. 2 is a diagram of an example embodiment of a process of deduplication of sensor data.

Referring now to FIG. 2, an example embodiment of a process of deduplication of sensor data for wireless network 100 is shown. In an example embodiment, the process of deduplication of sensor data may be implemented by a network gateway apparatus 200. Network gateway apparatus 200 is a device that performs the functions of an edge router for connecting wireless network 100 with other networks, including, for example, IoT cloud 120.

In an example embodiment, network gateway apparatus 200 is configured to communicate with a plurality of gateways in wireless network 100, including first gateway 104, second gateway 106, and third gateway 108, described above. In this embodiment, each gateway 104, 106, 108 receives its respective copy of packet A 110 advertised or broadcast from wireless sensor 102. As shown in FIG. 2, first gateway 104 receives first copy of packet A 110(1), second gateway 106 receives second copy of packet A 110(2), and third gateway 108 receives third copy of packet A 110(3). In this embodiment, upon receiving a copy of packet A, each gateway generates and adds a timestamp to the packet marking when the copy of the packet was received by the respective gateway.

In this embodiment, instead of each gateway 104, 106, 108 sending its copy of packet A to IoT cloud 120, as shown in FIG. 1, gateways 104, 106, 108 send copies of packet A 110 (i.e., first copy 110(1), second copy 110(2), and third copy 110(3)) to master gateway apparatus 200. Master gateway apparatus 200 implements a deduplication process 202 according to the example embodiments described herein to eliminate the copies of packet A 110 it receives. After deduplication process 202, master gateway apparatus 200 sends or transmits only a single copy of packet A 110 to IoT cloud 120 where it is received by IoT application 130. With this configuration, because of deduplication process 202 performed by master gateway apparatus 200, IoT application 130 receives one copy of packet A 110, instead of three copies, as illustrated in the embodiment shown in FIG. 1.

Details of deduplication process 200 implemented by master gateway apparatus 200 will be described further in reference to FIGS. 3-9 below. In some embodiments, deduplication process 200 operates over a user-defined period of time or time window during which duplicate packets are identified, prevented from being forwarded, and thrown out or deleted.

Figure 3:
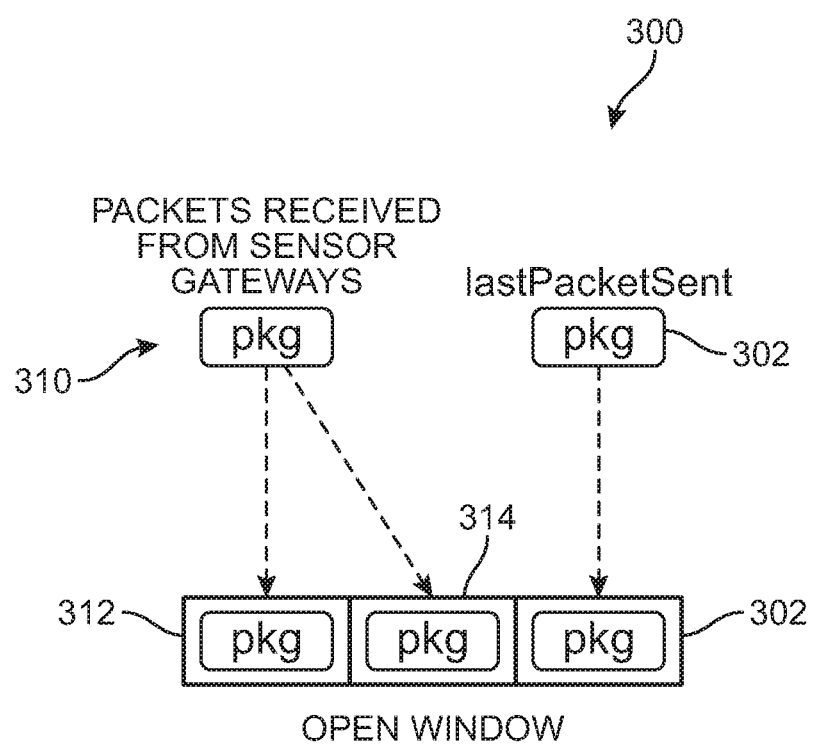
FIG. 3 is a diagram of an example embodiment of packets received during a time period.

Referring now to FIG. 3, a period of time corresponding to an open time window 300 is illustrated. In this embodiment, open time window 300 is a period of time during which duplicate packets are held until the time difference between the oldest packet and the latest (i.e., most recent) packet reaches a predefined maximum value (e.g, "maxTimeWindowSize"). This predefined maximum value may be a user-defined value. According to the deduplication process 202 of the present embodiments, only the oldest packet in open time window 300 is sent out (e.g., sent to IoT cloud 120) and all other received packets in open time window 300 are considered duplicates to be deleted or thrown away.

For example, as shown in FIG. 3, a first packet 302 is received at master gateway apparatus 200 during open time window 300. First packet 302 may be identified as the oldest packet based on the timestamp included in the packet added by the receiving gateway, as described above in reference to FIG. 2. In this embodiment, first packet 302 may be identified or marked (e.g., "lastPacketSent") to indicate that it is the oldest packet in open time window 300.

Additional packets 310 are received at master gateway apparatus 200 during open time window 300 from various sensor gateways in wireless network 100. For example, one or more packets may be received from gateways 104, 106, 108. In this embodiment, additional packets 310 include at least a first duplicate packet 312 and a second duplicate packet 314. During the period of time associated with open time window 300 additional duplicate packets 310 may be received.

Figure 4:
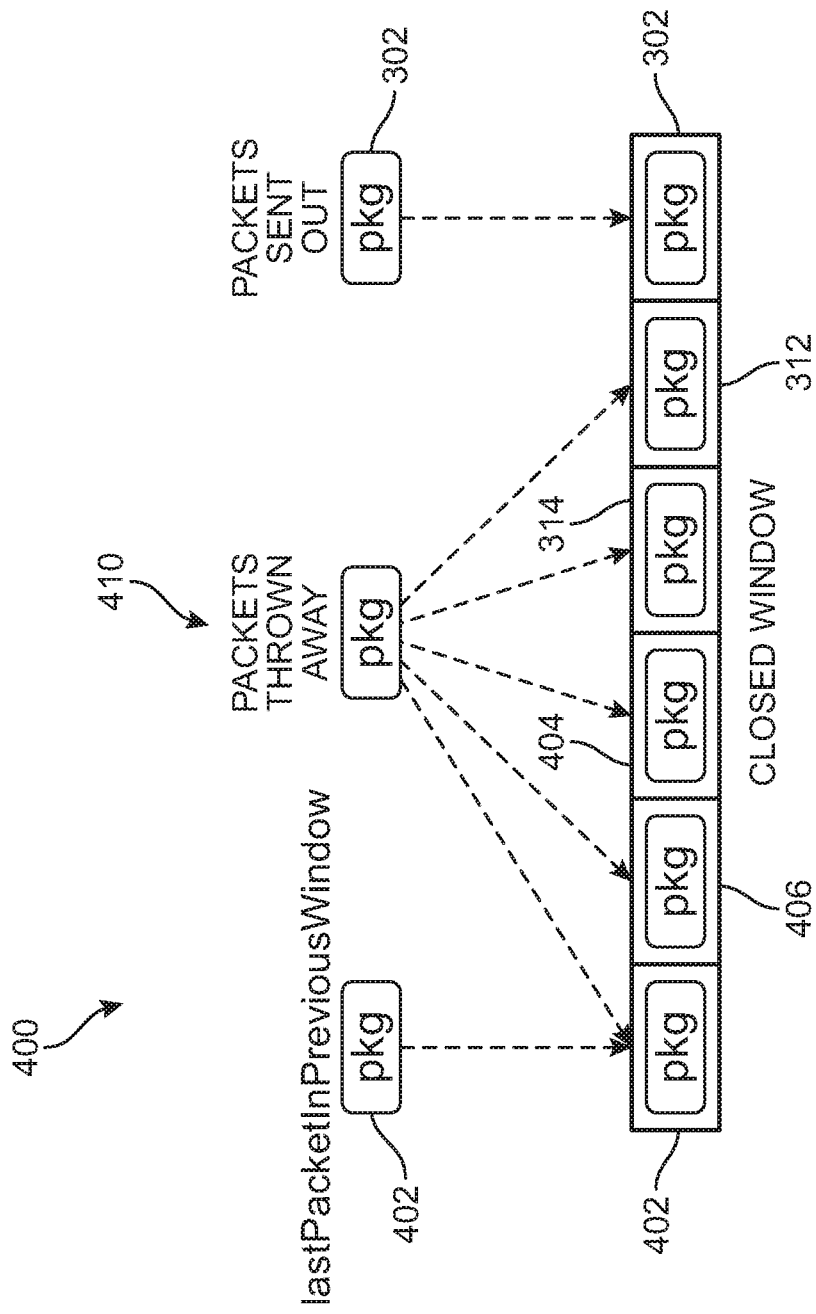
FIG. 4 is a diagram of an example embodiment of deleting duplicate packets during a time period.

Referring now to FIG. 4, in this embodiment, the period of time corresponding to open time window 300 has ended, resulting in a closed time window 400. In the example embodiments, the size of a time window is determined by the time difference between the timestamps associated with the latest or most recent packet and the oldest packet in the time window. The total number of packets received during the time window, therefore, is not a fixed number, but is rather a function of the predefined maximum value for the size of the time window (e.g, "maxTimeWindowSize"). That is, the window size of the present embodiments differs from other techniques that use a sliding window algorithm that determines a window size based on a total number of packets.

As shown in FIG. 4, closed time window 400 includes a copy of a packet 402 (e.g., "lastPacketInPreviousWindow") that was the last packet received by the master gateway (e.g., master gateway apparatus 200) during the previous time window. As will be described in more detail below, packet 402 may be used during the deduplication process to check whether a packet is a duplicate of a packet from the previous period of time, but which may have been delayed being received at master gateway apparatus 200. Closed time window 400 also includes copies of duplicate packets, including first duplicate packet 312, second duplicate packet 314, a third duplicate packet 404, and a fourth duplicate packet 406, received before expiration of the period of time for closed time window 400 that include identical or equivalent data as first packet 302. Closed time window 400 includes a copy of first packet 302 (e.g., "lastPacketSent") that is sent out to IoT cloud 120 upon expiration of the period of time associated with closed time window 400.

In an example embodiment, deduplication process 202 performed by master gateway apparatus 200 includes deleting or throwing away duplicate packets received during closed time window 400. In this embodiment, deleted packets 410 include packet 402 and duplicate packets, including first duplicate packet 312, second duplicate packet 314, third duplicate packet 404, and fourth duplicate packet 406, that are all deleted or thrown out after the expiration of the period of time associated with closed time window 400.

Figure 5:
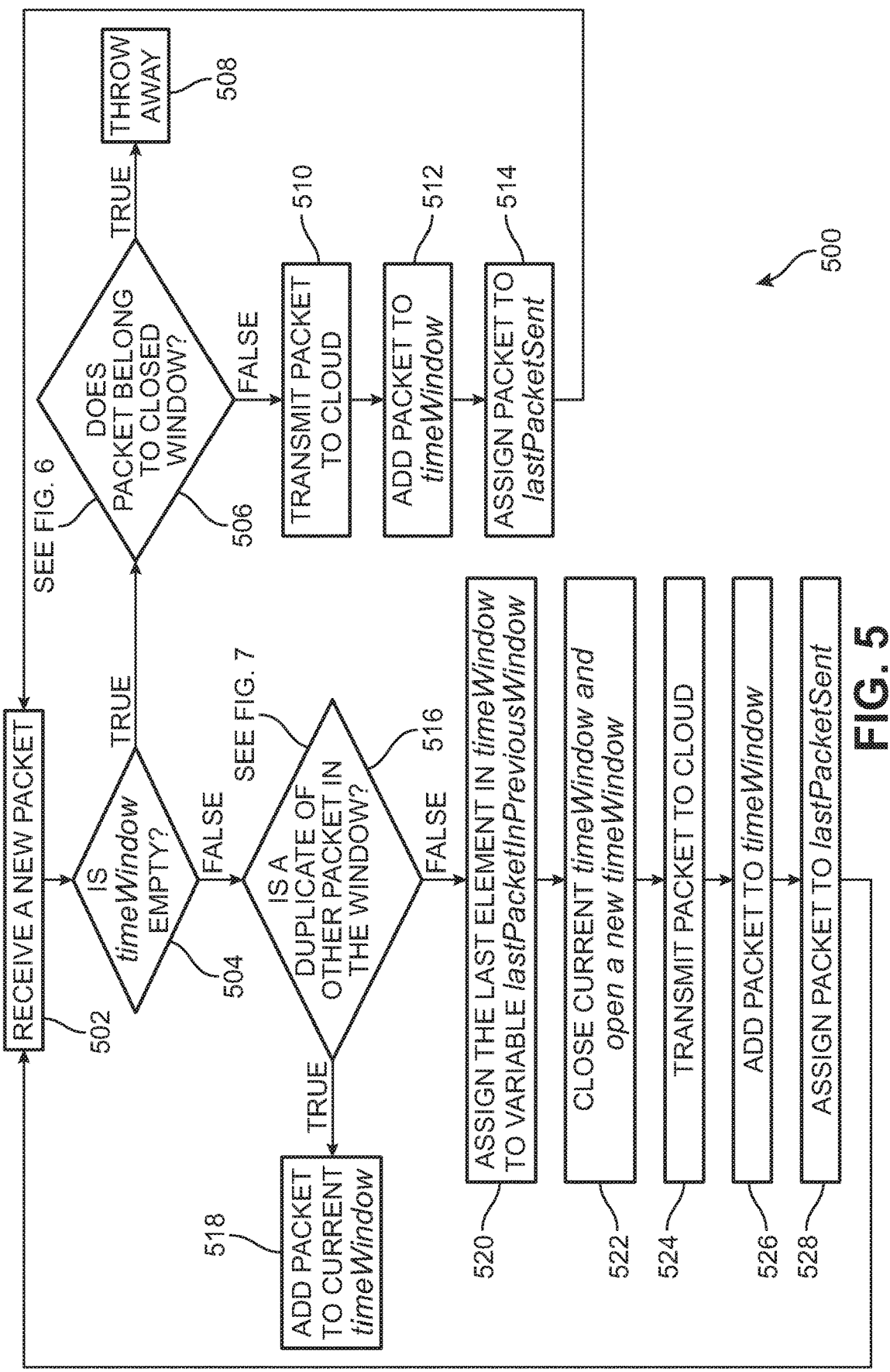
FIG. 5 is a flowchart of an example embodiment of a process of deduplication of sensor data.

FIG. 5 is a flowchart of an example embodiment of a process 500 of deduplication of sensor data. In some embodiments, process 500 of deduplication of sensor data may be implemented by an edge router or master gateway (e.g., master gateway apparatus 200). In an example embodiment, process 500 utilizes the two variables described above with reference to FIGS. 3 and 4, including "lastPacketSent" identifying the last packet sent to IoT cloud 120, which is the first packet of a closed time window or a newly opened time window (e.g., first packet 302, shown in FIGS. 3 and 4 above), and "lastPacketInPreviousWindow" identifying the last packet in the previously closed time window after a newly opened time window has begun (e.g., packet 402, shown in FIG. 4).

In an example embodiment, process 500 may begin at an operation 502 where a master gateway apparatus receives a packet from a sensor gateway. For example, as shown in FIG. 2, master gateway apparatus 200 may receive a copy of sensor data packet 110 from one of gateways 104, 106, 108, which are sensor gateways for wireless sensor 102. Upon receiving the packet at operation 502, process 500 of deduplication of sensor data proceeds to an operation 504 to determine whether the current time window (e.g., period of time) is empty or not.

At operation 504, if the current time window is empty (i.e., the open time window does not contain any packets), then the result is True and process 500 proceeds to an operation 506. Before the master gateway adds the new packet into the empty time window, it first needs to check at operation 506 whether the new packet belongs to the previous time window that was just closed. The specifics of the logic associated with operation 506 is explained in more detail with reference to FIG. 6.

Figure 6:
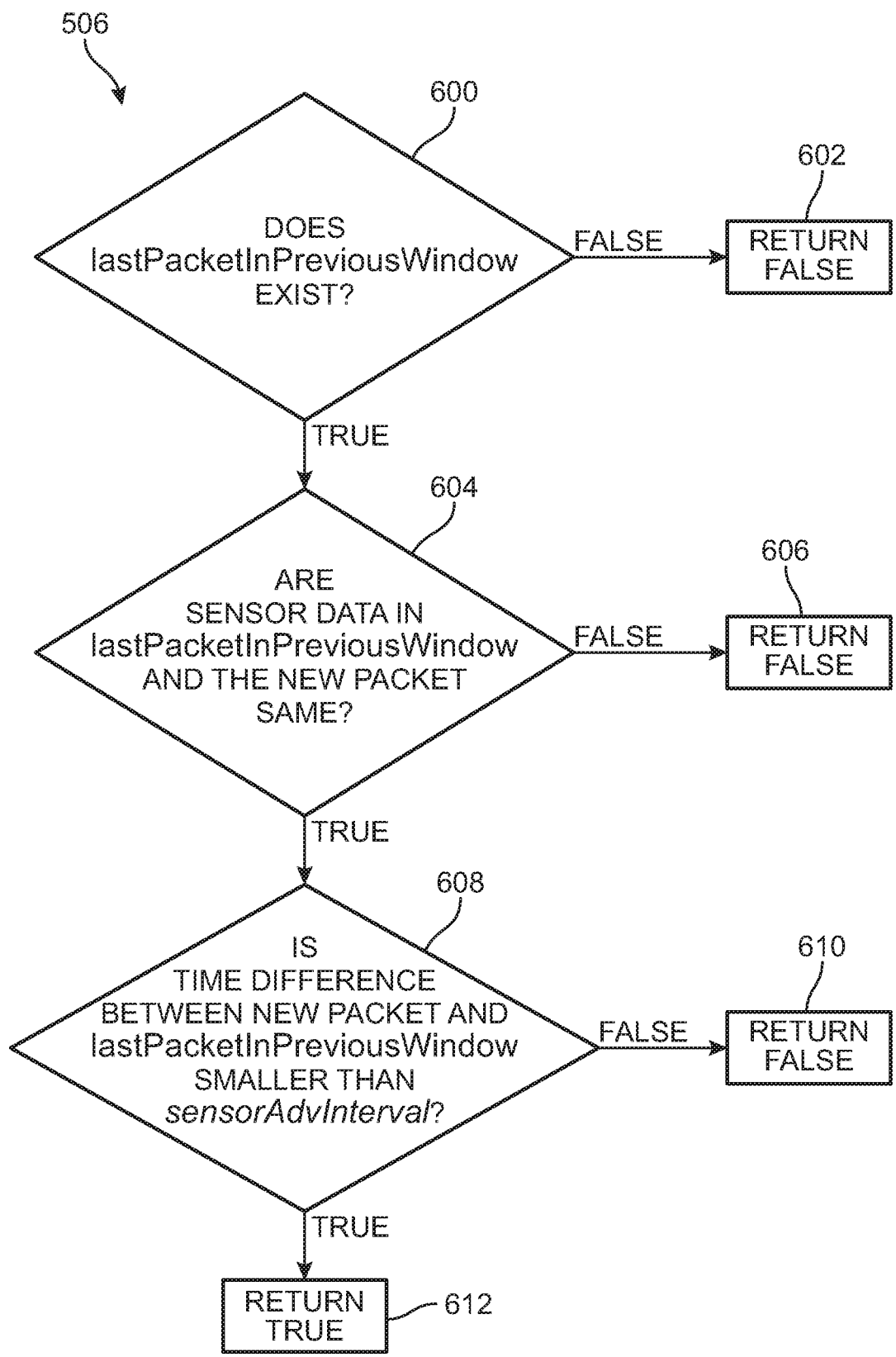
FIG. 6 is a flowchart of an example embodiment of a process of determining whether a packet coincides with a time period.

Referring now to FIG. 6, the logic of operation 506 is described in further detail for determining whether a packet coincides with a previous time period (e.g., the closed previous time window). In this embodiment, at an operation 600, whether or not a copy of the last packet sent out during the previous time window (e.g., "lastPacketInPreviousWindow") exists is determined. For example, as shown in FIG. 4, packet 402 is the last packet sent out during the previous time window (e.g., "lastPacketInPreviousWindow"). At operation 600, in response to determining that this packet does not exist (i.e., no copy of a last packet is saved), then the result of operation 600 is False, and, at an operation 602, a return False is provided to operation 506 of process 500.

Upon determining at operation 600 that a copy of the last packet sent out during the previous time window (e.g., "lastPacketInPreviousWindow") does exist, then the result of operation 600 is True and the logic of operation 506 proceeds to an operation 604. At operation 604, the master gateway checks whether or not the sensor data contained in the new packet is the same as the sensor data contained in the copy of the last packet sent out during the previous time window (e.g., "lastPacketInPreviousWindow"). In response to determining that the sensor data is not the same (i.e., is not an equivalence), then the result of operation 604 is False, and, at an operation 606, a return False is provided to operation 506 of process 500.

Upon determining at operation 604 that the sensor data contained in the new packet is the same as the sensor data contained in the copy of the last packet sent out during the previous time window, then the result of operation 604 is True and the logic of operation 506 proceeds to an operation 608. At operation 608, the master gateway checks the time difference between a timestamp associated with the new packet and a timestamp associated with the copy of the last packet sent out during the previous time window (e.g., "lastPacketInPreviousWindow"). In response to determining that the difference between the timestamps is not smaller than a predetermined threshold (e.g., "sensorAdvInterval"), then the result of operation 608 is False, and, at an operation 610, a return False is provided to operation 506 of process 500. The predetermined threshold used at operation 608 may be a time interval associated with the rate at which a wireless sensor advertises its data packets. For example, wireless sensor 102 may have an advertising rate where new data packets are sent out at intervals of ten seconds.

Upon determining at operation 608 that the difference between the timestamps is smaller than the predetermined threshold (e.g., "sensorAdvInterval"), then the result of operation 608 is True, and, at an operation 612, a return True is provided to operation 506 of process 500. Referring back to FIG. 5, the return True from operation 612 is provided as the outcome or result of operation 506 in process 500, where the new packet is then thrown away or deleted at an operation 508. That is, the True result from operation 506 (determined according to the details of the logic of operation 516 shown in FIG. 6) determines that the new packet received at operation 502 belongs to the previous window and should not be kept.

Upon determining at operation 506 that the new packet does not belong to the previous window (i.e., any result of the logic of operation 506 returns False), then process 500 proceeds to an operation 510 where the master gateway transmits the packet to the cloud (e.g., IoT cloud 120). In addition, this new packet is added to the newly opened time window at an operation 512 and at an operation 514, the new packet is assigned to the variable "lastPacketSent". For example, as shown with reference to first packet 302 in FIG. 3 above.

As described above, a sensor packet could be received by multiple gateways. Because of the latency between sensor data being received at sensor gateways (e.g., gateways 104, 106, 108) and the master gateway (e.g., master gateway apparatus 200), a packet received by a sensor gateway first might not be transferred to the master gateway earliest. Therefore, every time a new packet is added into the current open time window (e.g., "timeWindow"), all of the existing packets in the current open time window need to be resorted by their respective timestamps. After sorting, the packet with the earliest timestamp will be located to the left of the packets with later timestamps in the open time window.

Referring back to operation 504, if the currently open time window is not empty when receiving a new packet at operation 502, then the result of operation 504 is False and process 500 proceeds to an operation 516. At operation 516, the master gateway checks whether or not this new packet is a duplicate of packet(s) already in the currently open time window. The logic associated with operation 516 to determine whether a packet is a duplicate of other packets in the time window is depicted in FIG. 7.

Figure 7:
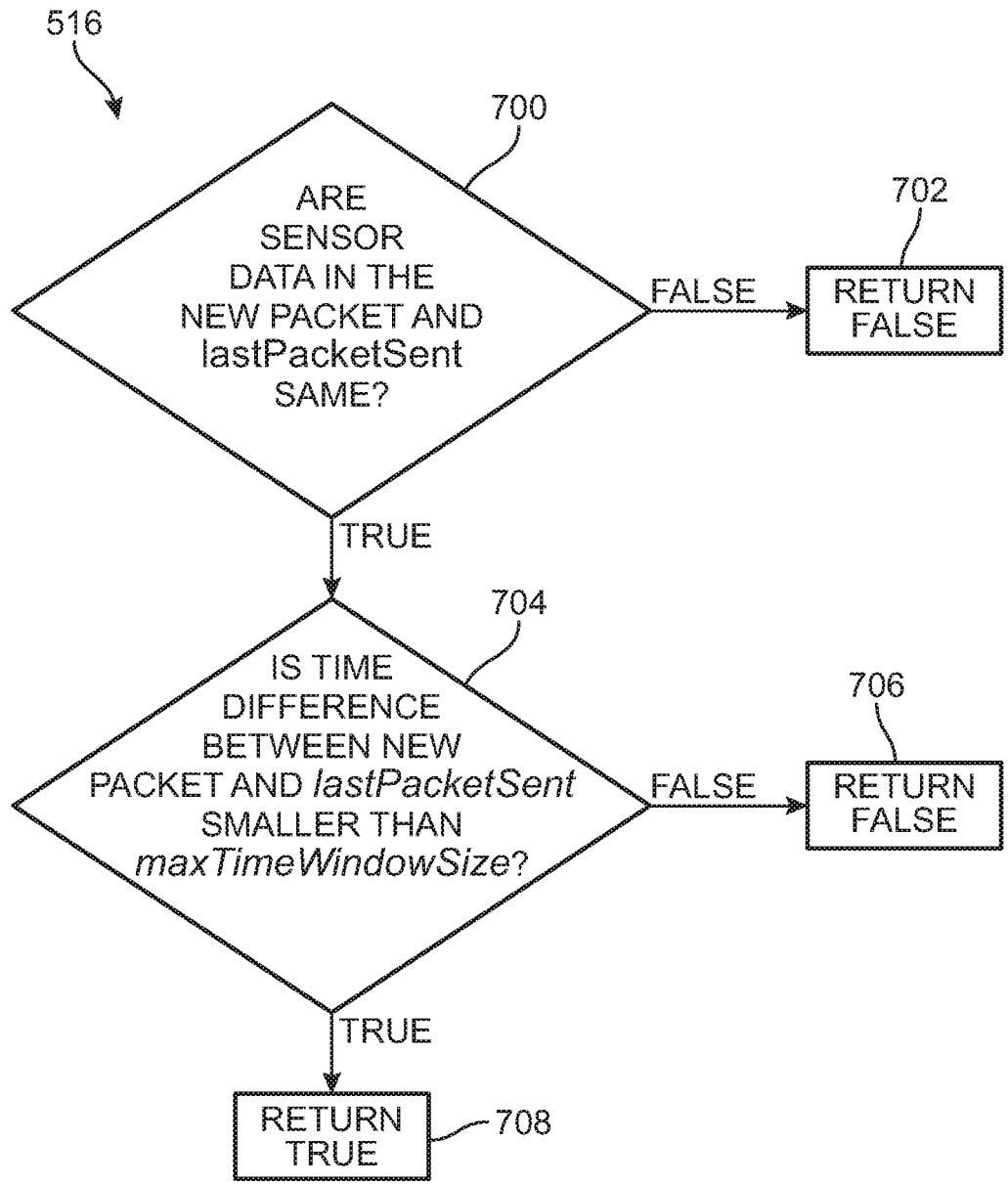
FIG. 7 is a flowchart of an example embodiment of a process of determining an equivalence of a packet to a stored packet.

Referring now to FIG. 7, at an operation 700, the sensor data in the new packet is compared to the sensor data in the first packet in the open time window (i.e., the packet that has been assigned to the variable "lastPacketSent"). Upon determining at operation 700 that the sensor data is not the same (i.e., is not an equivalence), then the result of operation 700 is False and, at an operation 702, a return False is provided to operation 516 of process 500. Upon determining at operation 700 that the sensor data is the same (i.e., is an equivalence), then the result of operation 700 is True and the logic of operation 516 proceeds to an operation 704.

At operation 704, the master gateway checks whether a time difference between the timestamp associated with the new packet and the timestamp associated with the first packet in the open time window (i.e., the packet that has been assigned to the variable "lastPacketSent") is smaller than a predetermined amount. In this embodiment, the predetermined amount is associated with a maximum period of time for the time window (e.g., "maxTimeWindowSize"). In some embodiments, the maximum period of time for the time window may be a set value, for example, five seconds. In other embodiments, the predetermined amount may be a smaller or larger period of time.

In response to determining that the time difference between the timestamps at operation 704 is not smaller than the predetermined amount, then the result of operation 704 is False and, at an operation 706, a return False is provided to operation 516 of process 500. Upon determining at operation 704 that the time difference between the timestamps at operation 704 is smaller than the predetermined amount, then the result of operation 704 is True and the logic of operation 516 proceeds to an operation 708. Referring back to FIG. 5, the return True from operation 708 is provided as the outcome or result of operation 516 in process 500, where the new packet is then added to the currently open time window (e.g., added to current "timeWindow") at an operation 518.

That is, at operation 516, if the new packet's sensor data is same as other packets in the currently open time window, and adding this new packet will not make the size of the time window exceed the predetermined amount (i.e., "maxTimeWindowSize"), then the packet is determined to be a duplicate (i.e., an equivalence).

Upon determining at operation 516 that the new packet is not a duplicate (i.e., any result in the logic of operation 516 returns False), then process 500 proceeds to an operation 520. At operation 520, the last packet in the currently open time window is assigned to the variable "lastPacketInPreviousWindow", for example, as shown with reference to packet 402 of FIG. 4. Next, at an operation 522, the currently open time window is closed and a new time window is opened. At an operation 524, the new packet is transmitted or sent out to the IoT cloud (e.g., IoT cloud 120), and, at an operation 526, the new packet is added to the newly opened time window (i.e., "timeWindow"). Additionally, at an operation 528, after being sent out the new packet is assigned to the variable "lastPacketSent", for example, as described in reference to first packet 302 of FIG. 3 above.

Process 500 may be repeatedly implemented by the master gateway (e.g., master gateway apparatus 200) upon each occurrence of receiving a new packet from a sensor (e.g., from wireless sensor 102). With this configuration, deduplication of duplicate sensor data packets may be achieved so that IoT application 130 does not receive multiple copies of the same data packets.

In some situations, a sensor may provide more precise data than what an application that uses that data actually needs or uses. For example, a temperature sensor can provide readings down to a 10th of a degree Celsius, but for some applications, the whole number of a temperature reading is sufficient (i.e., 10.0° C. and 10.1° C. are treated as being the same temperature). In some embodiments, a sensor packet is treated as a duplication (i.e., an equivalence) if its sensor data is exactly the same as other packets in a time window. In other words, a packet with a temperature value of 10.0° C. is not considered a duplication of a packet with a temperature value of 10.1° C.

In other embodiments, however, a duplication definition may be extended to use a data variation range to handle these situations. That is, if a packet's sensor data falls within a variation range of the sensor data of a first packet in the time window, then the packet is treated as a duplicate (i.e., an equivalence). For example, with reference to the temperature sensor, a variation range may be set at ±0.5° C. With this arrangement, if the sensor data of the first packet in the open time window has a temperature value equal to 30° C., and the sensor data of a new packet has a temperature value that is less than 30.5° C. or larger than 29.6° C. (i.e., 30° C.±0.5° C.), then the new packet is considered to be a duplicate (i.e., an equivalence).

Figure 8:
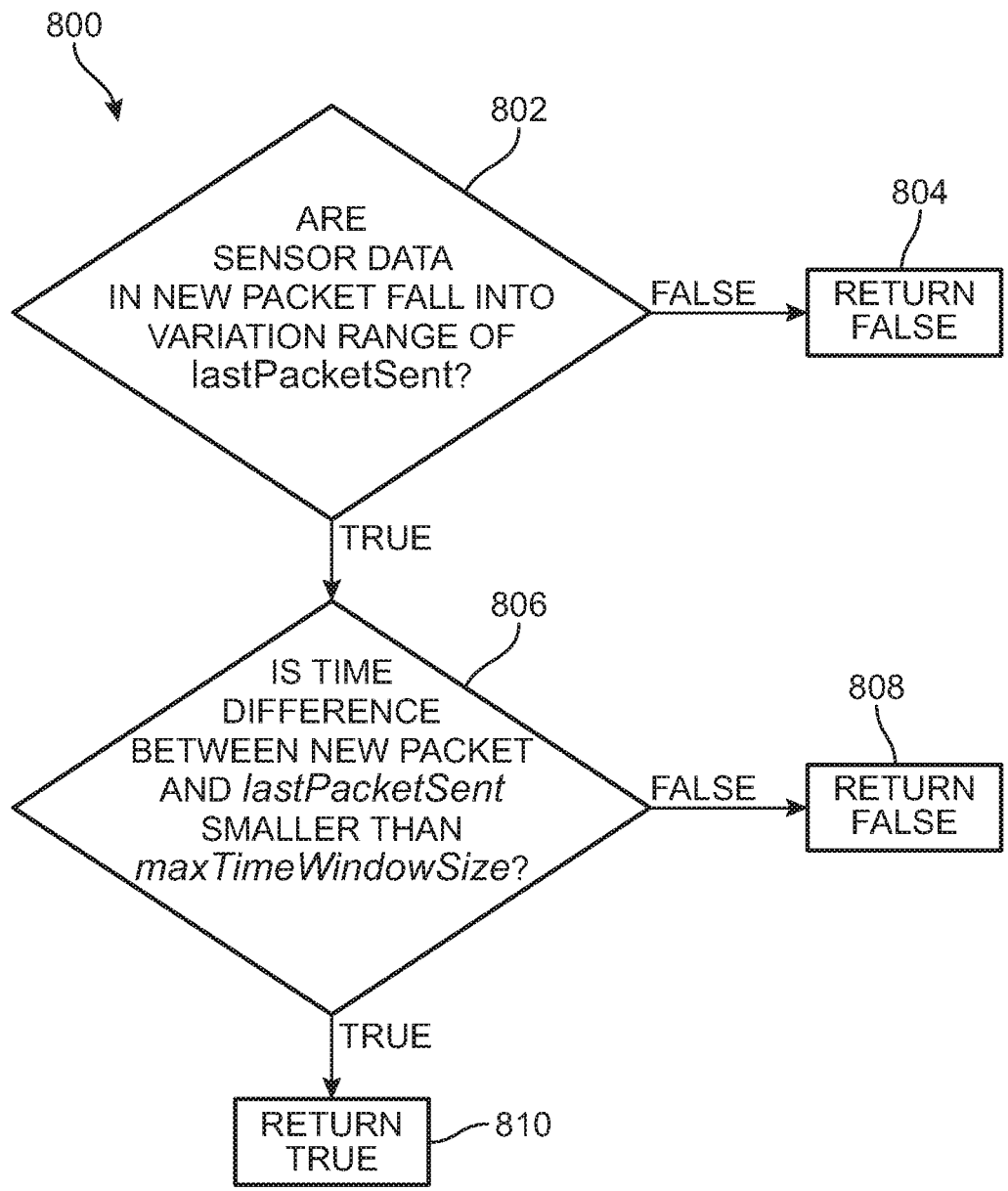
FIG. 8 is a flowchart of an example embodiment of an alternate process of determining an equivalence of a packet to a stored packet.

Referring now to FIG. 8, a flowchart of an example embodiment of an alternate process 800 of determining an equivalence of a packet to a stored packet is shown. In this embodiment, process 800 may be used in place of the logic of operation 516 described above in reference to FIG. 7 to account for variations in sensor data. Alternate process 800 may begin at an operation 802, where the sensor data in the new packet is compared to the sensor data in the first packet in the open time window (i.e., the packet that has been assigned to the variable "lastPacketSent") using a variation range. The variation range may be a fixed amount, as described with reference to the temperature sensor example above, or may be a percentage value (e.g., within 1%, 5%, etc.).

Upon determining at operation 802 that the sensor data does not fall within the permitted variation range of the sensor data of the first packet in the open time window, then the result of operation 802 is False and, at an operation 804, a return False is provided to operation 516 of process 500. Upon determining at operation 802 that the sensor data is within the permitted variation range (i.e., is an equivalence), then the result of operation 802 is True and the logic of process 800 proceeds to an operation 806.

At operation 806, the master gateway checks whether a time difference between the timestamp associated with the new packet and the timestamp associated with the first packet in the open time window (i.e., the packet that has been assigned to the variable "lastPacketSent") is smaller than a predetermined amount. In this embodiment, the predetermined amount is associated with a maximum period of time for the time window (e.g., "maxTimeWindowSize"). In some embodiments, the maximum period of time for the time window may be a set value, for example, five seconds. In other embodiments, the predetermined amount may be a smaller or larger period of time.

In response to determining that the time difference between the timestamps at operation 806 is not smaller than the predetermined amount, then the result of operation 806 is False and, at an operation 808, a return False is provided to operation 516 of process 500. Upon determining at operation 806 that the time difference between the timestamps is smaller than the predetermined amount, then the result of operation 806 is True and the logic of process 800 proceeds to an operation 810. Referring back to FIG. 5, the return True from operation 810 may then be provided as the outcome or result of operation 516 in process 500, where the new packet is then added to the currently open time window (e.g., added to current "timeWindow") at an operation 518. With this arrangement, variations in sensor data that fall within the variation range may be treated as being substantially similar (i.e., an equivalence) for the purposes of deduplication process 500.

Generally, there are two types of data that can be monitored by IoT systems: event data and sample data. For example, motion detected or light on/off detection are examples of events associated with event data. Measuring the $CO_2$, temperature, or humidity values every 10 seconds are examples of sampling associated with sample data. In particular for sample data, the alternate process 800 described above may be used. Alternate process 800 leverages the existing algorithm but only sends the current deduplicated data to the IoT cloud (e.g., IoT cloud 120) on a fixed interval, no matter what the value is. In the temperature sensor example, a time window of five seconds may be used for deduplication and a sampling window of ten seconds is used for refreshing the sensor data values. In this example, the master gateway (e.g., master gateway apparatus 200) obtains unique values within the ten second sampling window but will only send the most current value to the IoT cloud (e.g., IoT cloud 120) on ten second intervals.

Figure 9:
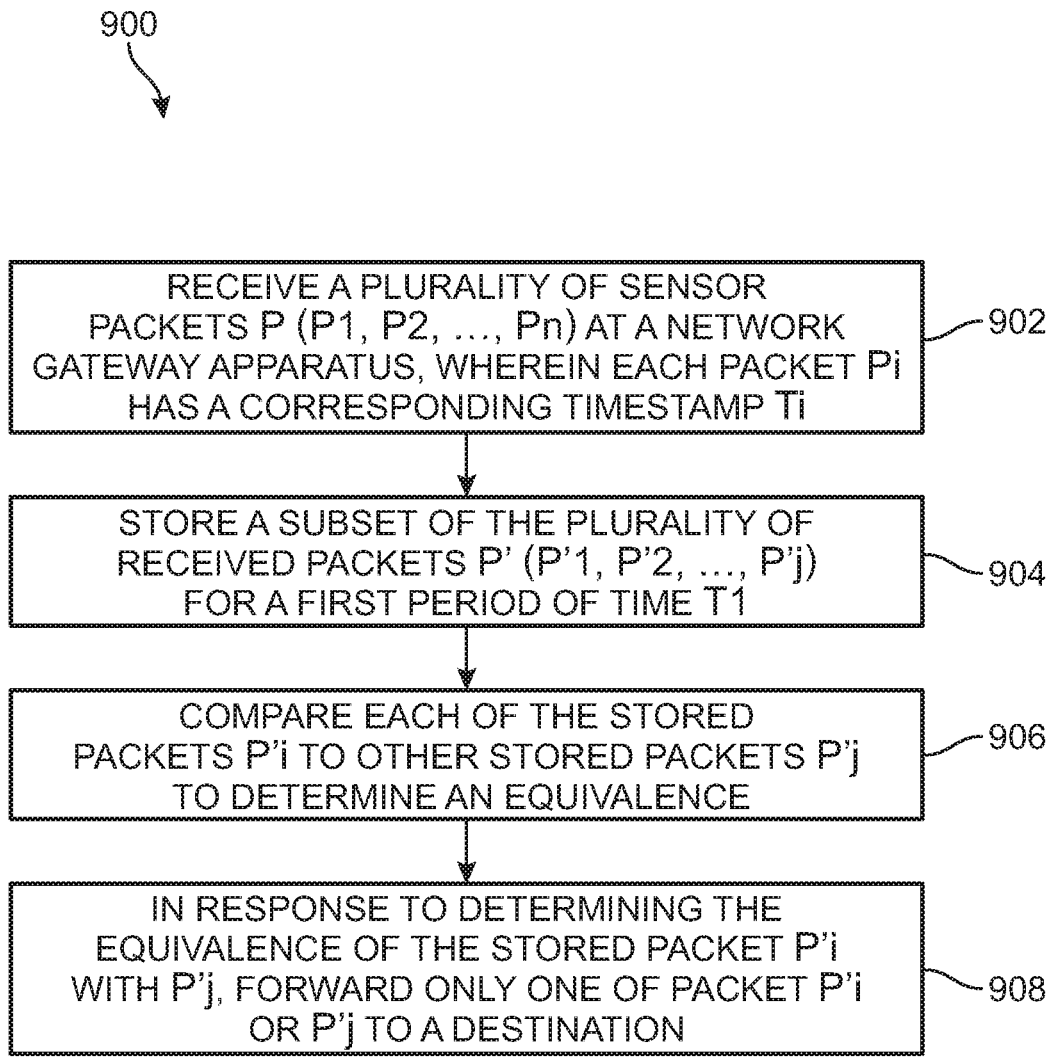
FIG. 9 is a flowchart of an example embodiment of a method for deduplication of sensor data.

Referring now to FIG. 9, a flowchart of an example embodiment of a method 900 for deduplication of sensor data is shown. In an example embodiment, method 900 may be implemented by a master gateway or edge router for a network that communicates with another network, for example, an IoT cloud. For example, as shown in FIG. 2, master gateway apparatus 200 serves as an edge router for network 100 to communicate with IoT cloud and IoT application 130. In this embodiment, method 900 may begin an operation 902. At operation 902, a plurality of sensor packets P (P1, P2, . . . , Pn) are received at a network gateway apparatus, wherein each packet Pi has a corresponding timestamp Ti. For example, as shown in FIG. 2, first gateway 104 receives first copy of packet A 110(1), second gateway 106 receives second copy of packet A 110(2), and third gateway 108 receives third copy of packet A 110(3).

Method 900 also includes an operation 904 where a subset of the plurality of received packets P' (P'1, P'2, . . . , P'j) are stored for a first period of time T1. For example, the first period of time T1 may correspond to a currently open time window, as shown in FIG. 3. Next, at an operation 906, each of the stored packets P'i is compared to other stored packets P'j to determine an equivalence. For example, the process for determining the equivalence may be implemented as described above in reference to the logic of operation 516, shown in FIG. 7, or, in other embodiments, as described above in reference to alternate process 800, shown in FIG. 8, that takes into account a variation range for the sensor data.

Next, method 900 may proceed to an operation 908, where, in response to determining the equivalence of the stored packet P'i with P'j, only one of packet P'i or P'j is forwarded to a destination. For example, as described in reference to FIG. 4 above, duplicate packets 410 are thrown away or deleted and only one packet, first packet 302, is sent out or transmitted to its destination (e.g., IoT cloud 120 and/or IoT application 130).

Figure 10:
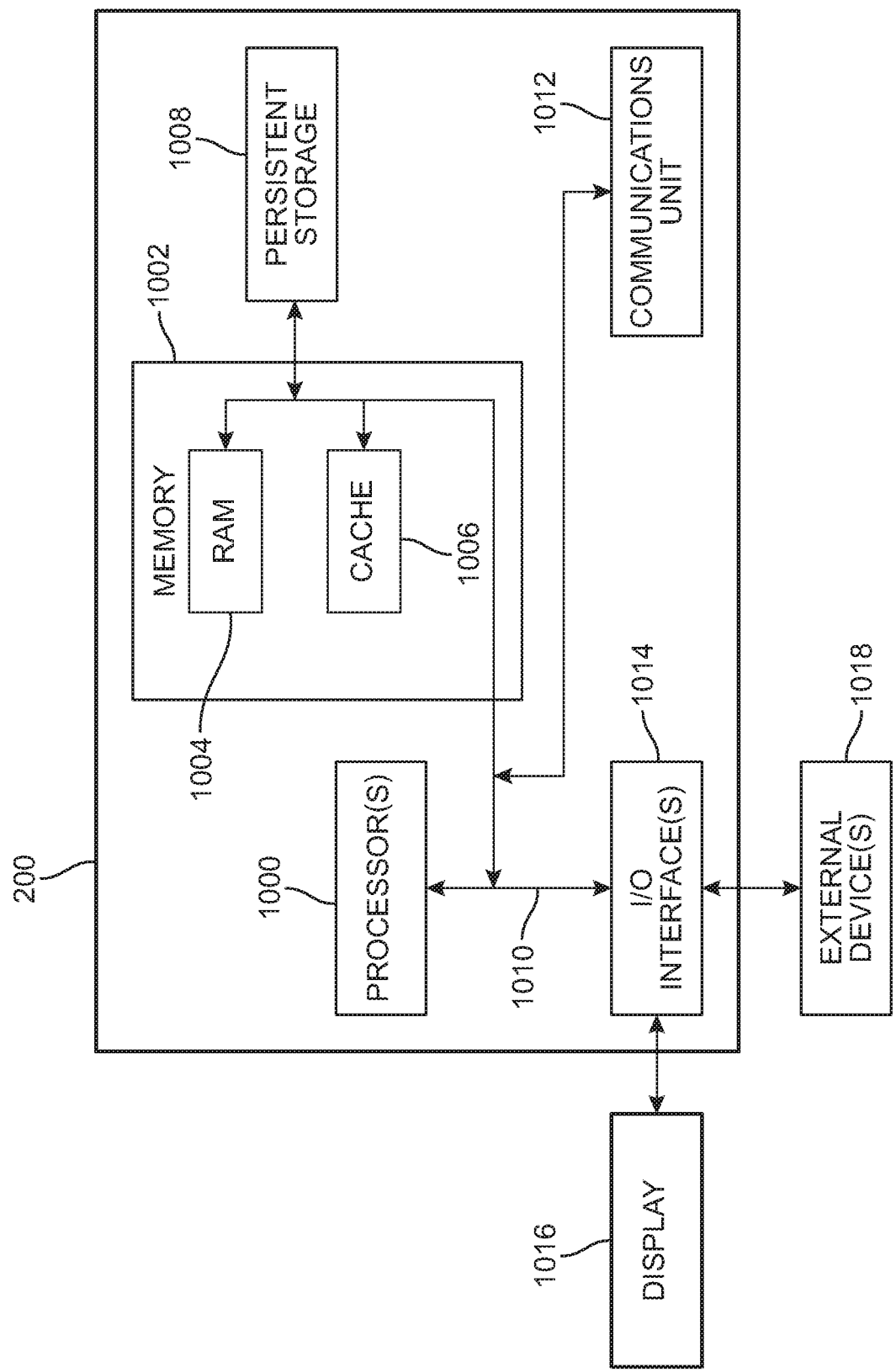
FIG. 10 is a block diagram of an example embodiment of an apparatus for implementing deduplication of sensor data.

FIG. 10 illustrates a block diagram of components of an example embodiment of an apparatus for implementing deduplication of sensor data. In an example embodiment, the apparatus is a master gateway or edge router, for example, master gateway apparatus 200. It should be appreciated that FIG. 10 provides only an illustration of one implementation and does not imply any limitations with regard to the environments in which different embodiments may be implemented. Many modifications to the depicted environment may be made.

In this embodiment, master gateway apparatus 200 includes one or more processors 1000. As shown in FIG. 10, master gateway apparatus 200 also includes a communications fabric 1010, which provides communications between processor(s) 1000, a memory 1002, persistent storage 1008, a communications unit 1012, and input/output (I/O) interface(s) 1014. Communications fabric 1010 can be implemented with any architecture designed for passing data and/or control information between processors (such as microprocessors, communications and network processors, etc.), system memory, peripheral devices, and any other hardware components within a system. For example, communications fabric 1010 may be implemented with one or more buses.

Memory 1002 and persistent storage 1008 are computer-readable storage media. In this embodiment, memory 1002 includes a random access memory (RAM) 1004 and a cache memory 1006. In general, memory 1002 can include any suitable volatile or non-volatile computer-readable storage media.

One or more programs may be stored in persistent storage 1008 for access and/or execution by one or more of the respective processors 1000 via one or more memories of memory 1002. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer-readable storage medium that is also part of persistent storage 1008.

Communications unit 1012, in this example, provides for communications with other processors, data processing systems, or devices. In an example embodiment, communications unit 1012 may include one or more network interface cards. Communications unit 1012 may provide communications through the use of either or both physical and wireless communications links.

I/O interface(s) 1014 allows for input and output of data with other devices that may be connected to master gateway apparatus 200. For example, I/O interface 1014 may provide a connection to external devices 1018, such as a keyboard, keypad, a touch screen, and/or some other suitable input device. External devices 1018 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1008 via I/O interface(s) 1014. I/O interface(s) 1014 may also connect to a display 1016. Display 1016 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deduplication of sensor data, the method comprising:
   receiving a plurality of sensor packets P (P1, P2, . . . , Pn) at a network gateway apparatus, wherein each sensor packet Pi of the received plurality of sensor packets P (P1, P2, . . . , Pn) has a corresponding timestamp Ti;
   storing a subset of the plurality of received sensor packets P' (P'1, P'2, . . . , P'j) for a first period of time T1;
   comparing each of the stored sensor packets P'i from the subset of received sensor packets P' (P'1, P'2, . . . , P'j) to other stored sensor packets P'z to determine an equivalence by:
      calculating a difference between a data value V'i in the stored sensor packet P'i and a data value V'j in the stored sensor packet P'z;
      comparing the difference to a threshold value; and
      upon determining that the difference is below the threshold value, identifying the equivalence of the stored sensor packet P'i with P'z; and
   in response to determining the equivalence of the stored sensor packet P'i with P'z, forwarding only one of sensor packet P'i or P'z to a destination.

2. The method of claim 1, further comprising:
   receiving a sensor packet Pk in a second period of time T2 after the first period of time T1, wherein the sensor packet Pk has a corresponding timestamp Tk that coincides with the first period of time T1; and
   preventing forwarding of the sensor packet Pk to the destination.

3. The method of claim 2, further comprising:
   receiving a sensor packet Pm in the second period of time T2 after the first period of time T1, wherein the sensor packet Pm has a corresponding timestamp Tm that coincides with the second period of time T2; and
   forwarding the sensor packet Pm to the destination.

4. The method of claim 3, further comprising:
   storing the sensor packet Pm at the network gateway apparatus for deduplication processing associated with the second period of time T2.

5. The method of claim 1, wherein the destination is an application associated with the sensor data.

6. The method of claim 1, wherein the sensor packets are generated from at least one sensor.

7. A computer program product for deduplication of sensor data, the computer program product comprising a computer readable storage medium having program instructions embodied therewith, the program instructions executable by a processor of a network gateway apparatus to cause the processor to perform a method comprising:
   receiving a plurality of sensor packets P (P1, P2, . . . , Pn) at a network gateway apparatus, wherein each sensor packet Pi of the received plurality of sensor packets P (P1, P2, . . . , Pn) has a corresponding timestamp Ti;
   storing a subset of the plurality of received sensor packets P' (P'1, P'2, . . . , P'j) for a first period of time T1;
   comparing each of the stored sensor packets P'i from the subset of received sensor packets P' (P'1, P'2, . . . , P'j) to other stored sensor packets P'z to determine an equivalence by:
      calculating a difference between a data value V'i in the stored sensor packet P'i and a data value V'j in the stored sensor packet P'z;
      comparing the difference to a threshold value; and
      upon determining that the difference is below the threshold value, identifying the equivalence of the stored sensor packet P'i with P'z; and
   in response to determining the equivalence of the stored sensor packet P'i with P'z, forwarding only one of sensor packet P'i or P'z to a destination.

8. The computer program product of claim 7, the method further comprising:
   receiving a sensor packet Pk in a second period of time T2 after the first period of time T1, wherein the sensor packet Pk has a corresponding timestamp Tk that coincides with the first period of time T1; and
   preventing forwarding of the sensor packet Pk to the destination.

9. The computer program product of claim 8, the method further comprising:
   receiving a sensor packet Pm in the second period of time T2 after the first period of time T1, wherein the sensor packet Pm has a corresponding timestamp Tm that coincides with the second period of time T2; and
   forwarding the sensor packet Pm to the destination.

10. The computer program product of claim 9, the method further comprising:

storing the sensor packet Pm at the network gateway apparatus for deduplication processing associated with the second period of time T2.

11. The computer program product of claim 7, wherein the destination is an application associated with the sensor data.

12. The computer program product of claim 7, wherein the sensor packets are generated from at least one sensor.

13. A computer system comprising:
one or more computer processors;
one or more computer-readable storage media;
program instructions stored on the computer-readable storage media for execution by at least one of the one or more processors, the program instructions comprising instructions to:
receive a plurality of sensor packets P (P1, P2, . . . , Pn) at the network gateway apparatus, wherein each sensor packet Pi of the received plurality of sensor packets P (P1, P2, . . . , Pn) has a corresponding timestamp T1;
store a subset of the plurality of received packets P' (P'1, P'2, . . . , P'j) for a first period of time T1;
compare each of the stored packets P'i from the subset of received sensor packets P' (P'1, P'2, . . . , P'j) to other stored packets P'z to determine an equivalence by:
calculating a difference between a data value V'i in the stored sensor packet P'i and a data value V'j in the stored sensor packet P'z;
comparing the difference to a threshold value; and
upon determining that the difference is below the threshold value, identifying the equivalence of the stored sensor packet P'i with P'z; and
in response to determining the equivalence of the stored packet P'i with P'z, forward only one of packet P'i or P'z to a destination.

14. The computer system of claim 13, further comprising instructions to:
receive a sensor packet Pk in a second period of time T2 after the first period of time T1, wherein the sensor packet Pk has a corresponding timestamp Tk that coincides with the first period of time T1; and
prevent forwarding of the sensor packet Pk to the destination.

15. The computer system of claim 14, further comprising instructions to:
receive a sensor packet Pm in the second period of time T2 after the first period of time T1, wherein the sensor packet Pm has a corresponding timestamp Tm that coincides with the second period of time T2; and
forward the sensor packet Pm to the destination.

16. The computer system of claim 15, further comprising instructions to:
store the sensor packet Pm at the network gateway apparatus for deduplication processing associated with the second period of time T2.

17. The computer system of claim 13, wherein the destination is an application associated with the sensor data.

* * * * *